(12) United States Patent
Gear

(10) Patent No.: US 6,360,692 B2
(45) Date of Patent: Mar. 26, 2002

(54) KITTY CORNER SCRATCHING APPARATUS

(76) Inventor: Walter L. Gear, 10316 NE. 187, Suite #405, Bothell, WA (US) 98011

( * ) Notice: Subject to any disclaimer, the term of this patent is extended or adjusted under 35 U.S.C. 154(b) by 0 days.

(21) Appl. No.: 09/782,651

(22) Filed: Feb. 12, 2001

Related U.S. Application Data

(60) Provisional application No. 60/183,119, filed on Feb. 17, 2000.

(51) Int. Cl.[7] ............................................. A01K 29/00
(52) U.S. Cl. ...................................................... 119/706
(58) Field of Search ................................ 119/706, 702, 119/707, 28.5, 652, 663, 664; D30/160, 158

(56) References Cited

U.S. PATENT DOCUMENTS

| | | | | |
|---|---|---|---|---|
| 2,005,817 A | * | 6/1935 | Yoder | 119/657 |
| D232,105 S | * | 7/1974 | Claassen | D30/158 |
| 4,177,763 A | * | 12/1979 | Cook | 119/706 |
| D254,813 S | * | 4/1980 | Kossar | 119/706 |
| 4,577,590 A | * | 3/1986 | Skroch | 119/706 |
| 4,611,556 A | * | 9/1986 | Frank | 119/706 |
| 4,907,540 A | | 3/1990 | Reynolds | 119/86 |
| 5,067,440 A | * | 11/1991 | Hatten et al. | 119/706 |
| D322,494 S | | 12/1991 | Reynolds | D30/158 |
| 5,113,795 A | | 5/1992 | Delzio | 119/51.01 |
| D336,033 S | * | 6/1993 | Welsh | D6/491 |
| 5,592,901 A | | 1/1997 | Birmingham | 119/706 |
| 5,619,953 A | | 4/1997 | Griffin | 119/706 |
| 5,875,735 A | | 3/1999 | Bradley et al. | 119/706 |

* cited by examiner

Primary Examiner—Yvonne R. Abbott
(74) Attorney, Agent, or Firm—Dean A. Craine

(57) ABSTRACT

An attractive, kitty corner scratching apparatus that easily attaches to the outside corner of a wall and that enables the carpet to be easily replaced. The apparatus includes a rigid, V-shaped wall-mounting bracket over which a complimentary-shaped carpet support plate may be attached. The wall-mounting bracket has four screw holes for permanent attachment to the desired position on the outside corner of a wall. Adhesively attached to the outer surface of the carpet support plate is a piece of carpet. The carpet support plate is designed to slide longitudinally over the wall-mounting bracket and then be sufficiently locked in position to support a cat pulling on the carpet. The piece of carpet may be easily replaced when frayed.

9 Claims, 4 Drawing Sheets

KITTY CORNER SCRATCHING APPARATUS

RELATED APPLICATIONS

This application claims the filing benefit under 35 U.S.C. 119(e) of U.S. Provisional Application No. 60/183,119, filed Feb. 17, 2000.

BACKGROUND OF THE INVENTION

1. Field of the Invention

This invention pertains to cat scratching apparatus, and, more particularly, to cat scratching apparatus that use replaceable parts and are wall-mounted.

2. Description of the Related Art

It is well known that cats have an innate need to sharpen their claws on a daily basis, and that they often choose household furniture on which to do so. This results in frayed, tattered, and unsightly wall surfaces and furniture.

Many cat owners purchase cat scratching posts, which are generally comprised of free standing, wooden posts covered with carpeting. However, these devices are less than ideal because they can be tipped over by the force of the cat's clawing motions, which often startles the cat making it less likely to use it to satisfy its clawing needs. These scratching posts are relatively large and take up considerable space in the main living room of the home. With continued use, they look tattered and unsightly. The owner may then either wastefully throw the scratching post away, or keep it and allow it to detract from the appearance of the room in which it is placed.

SUMMARY OF THE INVENTION

It is an object of the present invention to provide a scratching apparatus for cats.

It is another object of the present invention to provide a scratching apparatus that the cat will use on a regular basis in place of furniture or other objects in the home.

It is an object of the present invention to create a scratching apparatus that takes up less room, is less noticeable, and is more appealing than typical scratching posts.

These and other objects of the invention are met by an inconspicuous kitty corner scratching apparatus designed to be attached to the outside corner of a wall. The apparatus includes a piece of carpet adhesively attached to an elongated V-shaped carpet support plate. The carpet support plate is selectively attached to an elongated, rigid, V-shaped, wall-mounting bracket that is vertically aligned and permanently attached at a desired height over the outside corner of a wall.

The two outer longitudinal edges of the wall-mounting bracket extend outward from the wall and are engaged by the two outer longitudinal edges of the carpet support plate when the carpet support plate is longitudinally aligned over the wall-mounting bracket. Lateral movement of the carpet support plate over the wall-mounting bracket is prevented. End caps are attached to the upper and lower ends of the carpet support plate which prevent movement of the carpet support plate on the wall-mounting bracket and provide a more "finished" appearance.

The apparatus is designed for easy assembly and easy replacement of the piece of carpet.

DESCRIPTION OF THE PREFERRED EMBODIMENT(S)

Figure 1:
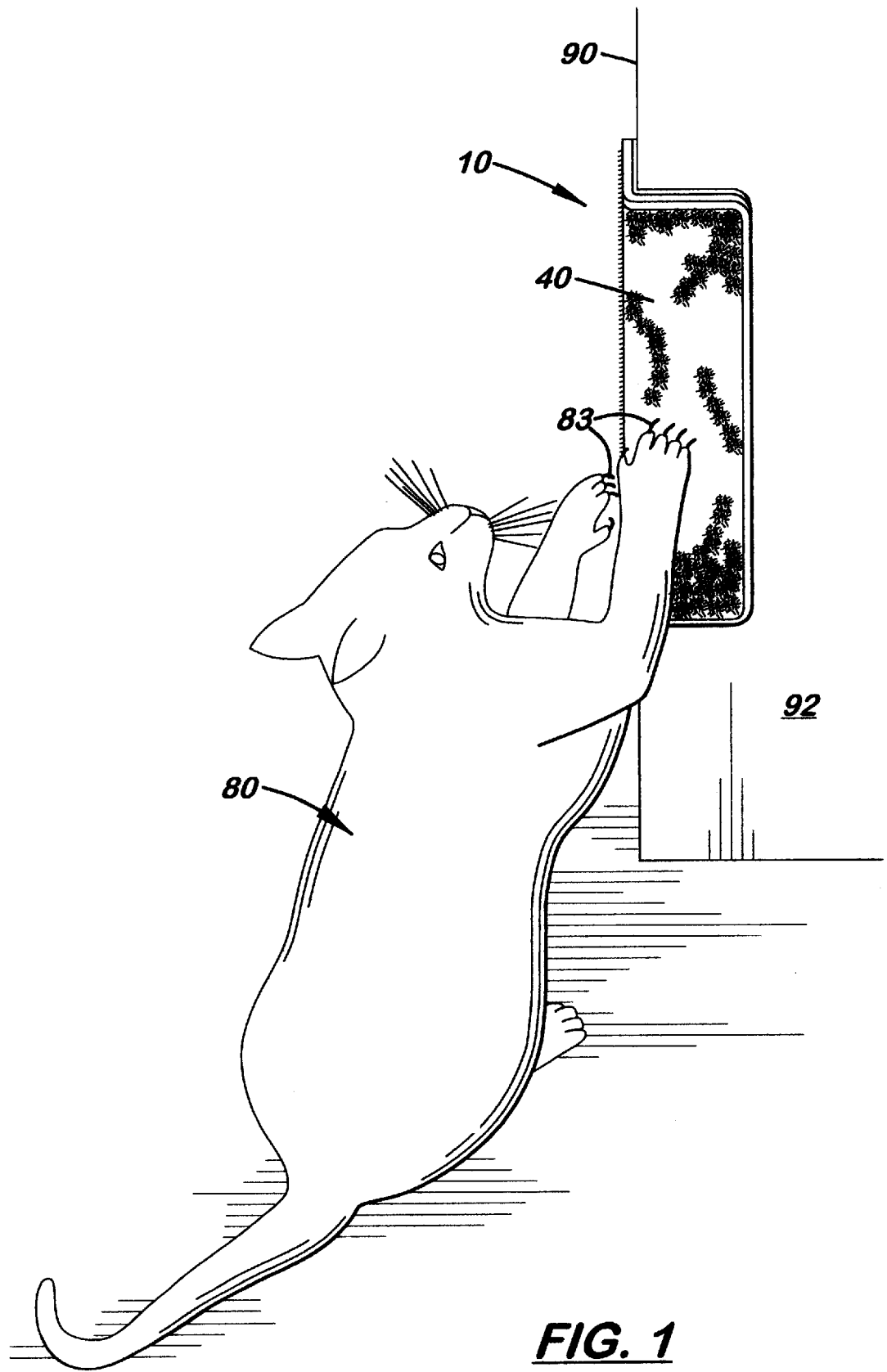
FIG. 1 is a perspective view of a cat using the kitty corner scratching apparatus, disclosed herein attached to the outside corner of a wall.

Shown in the accompanying FIGS. 1–5, there is shown a kitty corner scratching apparatus, generally referred to as 10 designed to be affixed to the outside corner 90 of a wall 92.

The kitty corner scratching apparatus 10 includes a rigid, V-shaped, wall-mounting bracket 20 over which a complimentary, V-shaped carpet support plate 30 is longitudinally aligned and attached. The carpet support plate 30 is completely covered with a single piece of carpet 40. The wall-mounting bracket 20 is an elongated structure, preferably made of steel or aluminum plate material, that is approximately 13 inches in length and ⅛ of an inch thick. The wall-mounting bracket 20 includes two equal-size, side members 22, 26 aligned perpendicularly and joined at their adjacent edges. Each side member, 22, 26 includes a raised outer edge 23, 27, respectively, as shown more clearly in FIGS. 2 and 3 used to align and hold the carpet support plate 30 thereon. In the preferred embodiment, the outer edges 23, 27 extend outward approximately 3/16 of an inch from the outer surface of the wall 92 when attached to the wall 92.

The carpet support plate 30 is a V-shaped plastic structure approximately two inches longer in length than the wall-mounting bracket 20. Side members 32, 36 of the carpet support plate 30 are also perpendicularly aligned and include inward directed curl members 34, 38, respectively, formed on their lateral edges that slidingly engage the raised outer edges 23, 27, respectively, on the wall-mounting bracket 20. During use, the curl members 34, 38 prevent lateral disengagement of the carpet support plate 30 from the wall-mounting bracket 20 when a cat's claws yank over the carpet. In the preferred embodiment, the carpet support plate 30 measures approximately 15 inches in length with each side member 32, 36 measuring approximately 3 inches in width. When properly assembled, the carpet support plate 30 is centered over the wall-mounting bracket 20.

The piece of carpet 40 is securely attached to the carpet support plate 30 using a suitable adhesive or two optional strips of double back tape 45 disposed between the front surfaces of the side members 32, 36 of the carpet support plate 30 and the back surface of the piece of carpet 40.

Attached to the opposite end(s) of the carpet support plate 30 are two end caps 50 used to prevent longitudinal movement of the carpet support plate 30 on the wall-mounting bracket 20. Since the edges of the piece of carpet 40 are exposed, the end caps 50 also provide a "fished" appearance. Each end cap 50 is V-shaped and includes two perpendicularly aligned side members 52, 55. Perpendicularly aligned on the distal ends of the two side members 52, 55 are two parallel outer pegs 53, 56 respectively. Also formed at the corner of each end cap 50 is an optional, central peg 58 aligned parallel to outer pegs 53, 56. Each outer peg 53, 56 includes a flexible outward extending tongue member 82, 84. Formed centrally on each side member 52, 55 is a perpendicularly aligned, plate member 54, 57, respectively.

During use, the outer pegs 53, 56 are inserted into the opened longitudinally aligned passageways 24, 28 formed inside the curl members 34, 38 of the carpet support plate 30. Located near the upper and lower ends of the two curl members 34, 38 are longitudinal slots 35, 39, respectively, designed to receive a tongue member 82 or 84. During assembly, the plate members 54, 57 are extended longitudinally and positioned against the adjacent edges of the wall-mounting bracket 20. The pegs 53, 56 are then inserted sufficiently into the open passageways 24, 28 so that the tongue members 82, 84 snap into the slots 35, 39, respectively, and hold the end caps 50 in place on the carpet support plate 30 and prevent longitudinal movement of the carpet support plate 30 over the wall-mounting bracket 20.

During the development of the apparatus 10, it was learned that cats prefer cut pile rather than loop pile carpet. A piece of cut pile carpet 40 is preferred because it enables the cat 80 to pull its claws 83 through the carpet fibers without snagging.

The apparatus 10 is designed to be initially sold as a complete unit. When the piece of carpet 40 on the carpet support plate 30 is frayed, tattered or the wrong color, it may be easily replaced on the carpet support plate 30 without removal of the wall-mounting bracket 20.

To install the apparatus 10, a suitable location on the corner 90 of a wall 92 is selected. Typically, the apparatus 10 is mounted at a sufficient height on the corner 90 so that the cat 80 is in an upright stretched position when the cat's claws 83 are near the lower end of the piece of carpet 40. The actual height of the apparatus 10 on the wall will vary depending on the size of the cat 80.

Figure 2:
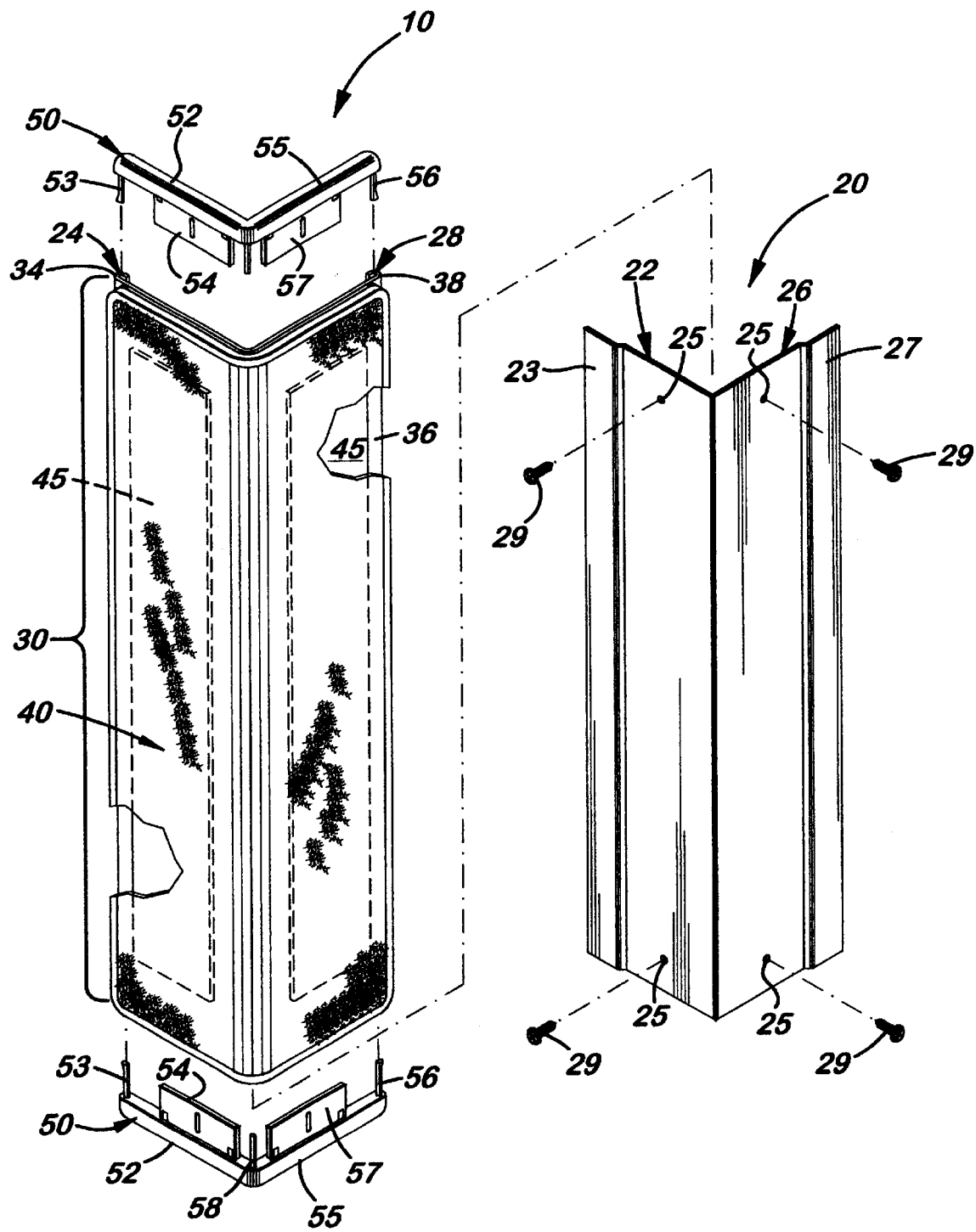
FIG. 2 is an exploded, perspective view of the apparatus showing the carpet attached to the carpet support plate.
Figure 3:
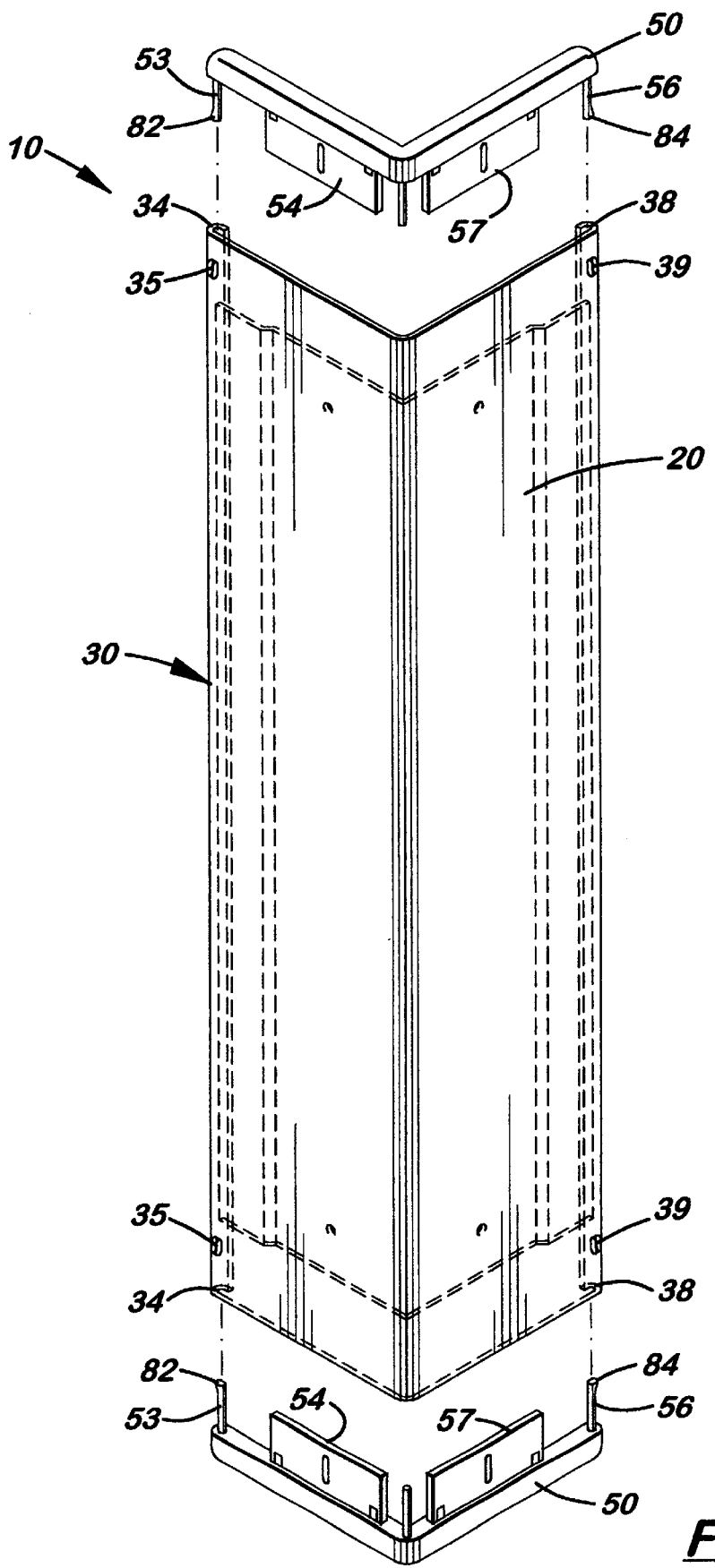
FIG. 3 is an exploded perspective view of the apparatus with the carpet removed to more clearly illustrate the end caps connected to the carpet support plate and the carpet support plate attached to the wall-mounting bracket.
Figure 4:
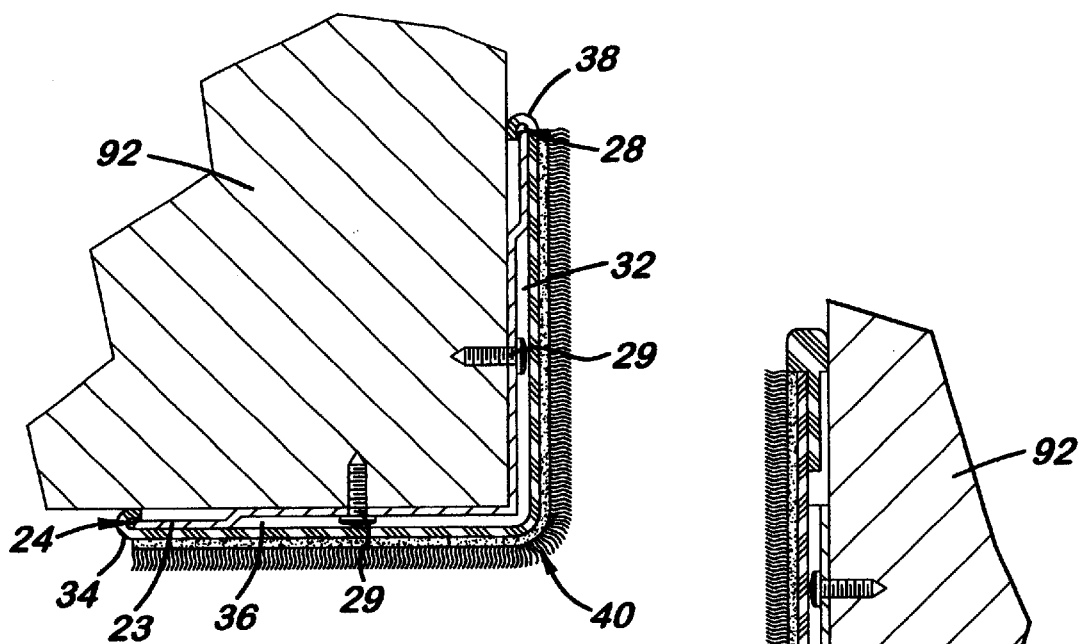
FIG. 4 is a sectional, top plan view of the invention shown attached to a wall.
Figure 5:
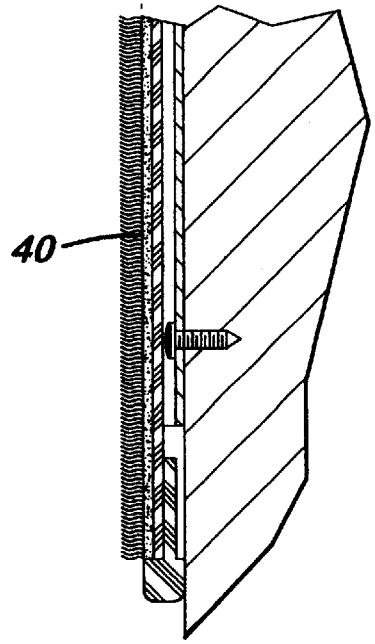
FIG. 5 is a sectional, side elevational view of the invention shown attached to a wall.

Once the desired location on the corner 90 is determined, the wall-mounting bracket 20 is then attached to the corner 90 using four wood screws 29, dry-wall screws, or lag bolts, extended through four holes 25 formed on the wall-mounting bracket 20 as shown in FIG. 2. The carpet support plate 30 with a piece of carpet 40 attached thereto is then longitudinally aligned with the wall-mounting bracket 20 and slidingly attached thereto by engaging the curl member 34, 38 around the raised outer edges 23, 27. The end caps 50 are then attached to the ends of the carpet support plate 30 to prevent movement of the carpet support plate 30 over the wall-mounting bracket 20.

In compliance with the statute, the invention has been described herein in language more or less specific as to structural features. It should be understood, however, that the invention is not limited to the specific features shown, since the means and construction shown comprise only the preferred embodiments for putting the invention into effect. The invention is therefore claimed in any of its forms or modifications within the legitimate and valid scope of the amended claims, appropriately interpreted in accordance with the doctrine of equivalents.

I claim:

1. A kitty corner scratching apparatus comprising:
   a. a V-shaped wall-mounting bracket, said wall-mounting bracket having parallel outer edges;
   b. means to attach said wall-mounting bracket in a vertically aligned position over an outside corner of a wall;
   c. a V-shaped carpet support plate complimentary in shape with said wall-mounting bracket;
   d. means to longitudinally align and attach said carpet support plate to said wall-mounting bracket;
   e. a piece of carpet attached to said carpet support plate;
   f. a carpet support plate holding means to prevent longitudinal movement of said carpet support plate over said wall-mounting bracket.

2. The kitty corner scratching apparatus, as recited in claim 1, wherein said carpet support plate includes a pair of curl members that engage said outer edges of said wall-mounting bracket.

3. The kitty corner scratching apparatus, as recited in claim 1, wherein said piece of carpet is attached to said carpet support plate by an adhesive.

4. The kitty corner scratching apparatus, as recited in claim 1, wherein said carpet support plate holding means is a pair of end caps selectively attached to the opposite ends of said carpet support plate to prevent movement of said carpet support plate over said wall-mounting bracket.

5. The kitty corner scratching apparatus, as recited in claim 4, wherein said carpet support plate includes longitudinally passageways and each said end cap includes two perpendicularly aligned side members, with each said side member including an outer peg, and each said outer peg including means to hold said end cap on said carpet support plate.

6. The kitty corner scratching apparatus, as recited in claim 5, wherein said means to hold said end cap on said carpet support plate is a flexible tongue formed on each said peg and a slot formed on said carpet support plate, wherein said tongue is inserted into said slot, said end cap is held on said carpet support plate.

7. The kitty corner scratching apparatus, as recited in claim 4, wherein said piece of carpet is made of cut pile carpet.

8. A kitty corner protecting apparatus comprising:
   a. a V-shaped wall-mounting bracket for mounting vertically over the outside corner of a wall, said wall-mounting bracket including two outer edges;
   b. a V-shaped carpet support plate selectively attached to said wall-mounting bracket, said carpet support plate having two outer curl edges capable of engaging said outer edges of said wall-mounting bracket;
   c. a piece of carpet attached to said carpet support plate;
   d. a pair of removable end caps attached to said carpet support plate;
   e. means to attach said wall-mounting bracket to the outside corner of a wall;
   f. means to attach said piece of carpet to said carpet support plate; and,
   g. means to selectively attach said carpet support plate to said wall-mounting bracket.

9. The kitty corner scratching apparatus, as recited in claim 8, wherein said piece of carpet is attached to said carpet support plate by an adhesive.

* * * * *